Sept. 26, 1961  A. G. STIMSON ET AL  3,001,443
EXPOSURE METER COMPENSATING DEVICE
Filed July 1, 1959

ALLEN G. STIMSON
JOHN H. EAGLE
NORMAN N. LAREAU
INVENTORS

BY R. Frank Smith
Robert W. Hampton

ATTORNEYS

United States Patent Office 3,001,443
Patented Sept. 26, 1961

3,001,443
EXPOSURE METER COMPENSATING DEVICE
Allen G. Stimson, John H. Eagle, and Norman N. Lareau, Rochester, N.Y., assignors to Eastman Kodak Company, Rochester, N.Y., a corporation of New Jersey
Filed July 1, 1959, Ser. No. 824,351
2 Claims. (Cl. 88—23)

The present invention relates to photographic exposure meters and more particularly concerns novel means for compensating such meters for variations in exposure factors.

Exposure meters having photocells, particularly those meters employed on photographic cameras, often are adjusted as to sensitivity of the photocell circuit in order to compensate for changes in exposure factors such as film exposure index, shutter speed, diaphragm opening or filter attenuation index. One of the most frequently used compensating devices is a mask which is adjusted to variably cover the surface of the cell. Although a variable mask is a simple and rugged device for attenuating the cell sensitivity, its precise calibration is virtually impossible with mass production techniques because of the inherent nonuniformity of the light sensitive surface of a typical photocell.

It is therefore a primary object of the present invention to mechanically attenuate the sensitivity of the photocell circuit in an exposure meter, while maintaining substantially the entire surface of the photocell exposed to light from the photographic subject.

It is a more particular object of the invention to attenuate a photocell circuit by rotating the photocell with respect to the path of light from the photographic subject.

A further object of the invention is to connect two photocells in bucking relation in an exposure meter and to adjust the meter sensitivity by rotating one of the photocells.

Another object is to exclude skylight from a photocell by rotating the latter downward about a horizontal axis.

Other objects of the invention will appear from the following description, reference being made to the accompanying drawings, wherein.

Figure 2:
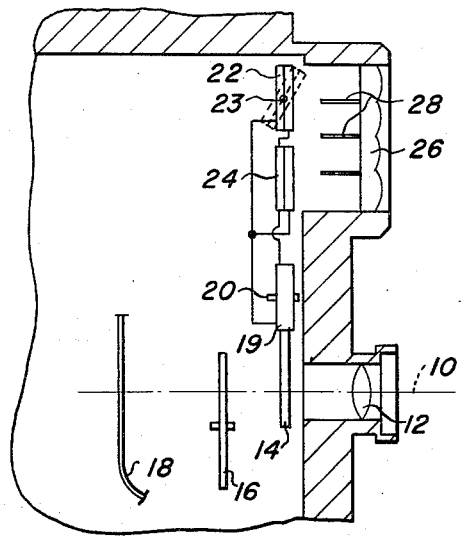
FIG. 2 is a schematic side view of the invention showing typical camera elements with which it may cooperate.

Referring to FIG. 2, a typical camera in which the present invention may be used, illustrated as a motion picture camera, comprises a taking-lens axis 10 on which are arranged a taking-lens system indicated generally at 12, a diaphragm 14, a shutter 16 and a photosensitive surface such as a film strip 18. The diaphragm 14 may be adjusted automatically by means of a galvanometer coil 19 pivoted at 20 and energized by a pair of photocells 22 and 24, such that the scene light admitted by the diaphragm to the film strip 18 has a substantially consistent intensity, irrespective of scene brightness.

Figure 1:
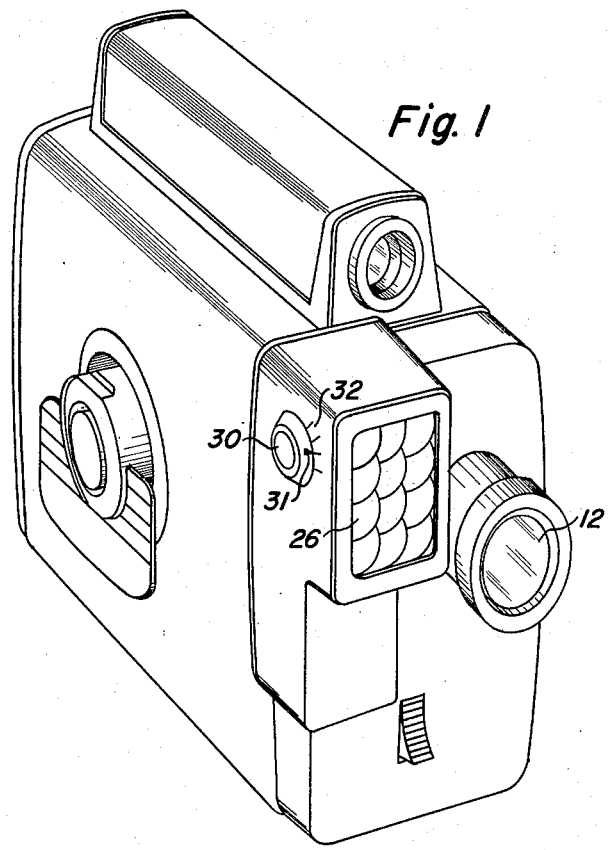
FIG. 1 is an isometric view of a camera employing the present invention.

Photocells 22 and 24 are connected in opposed or "bucking" relation to each other and are exposed to scene light through a lens block 26 and directional louvres 28. Cell 22 is pivoted at 23 about a horizontal axis by means of a manual adjustment knob 30 (FIG. 1) mounted on the exterior of the camera and having a pointer 31 which cooperates with a scale 32. This scale may be graduated in any convenient units of an exposure factor, which in the case of a motion picture camera normally would be film exposure index.

When both photocells 22 and 24 (FIG. 2) lie perpendicular to the path of scene light, as shown in solid lines, the electrical current generated by one cell exactly opposes that generated by the other cell, provided the cells are identical. In this condition, no energizing current is applied to the galvanometer coil 19, which therefore remains in its initial angular position, as determined for example by return springs (not shown) familiar to those skilled in the art. Sensitivity of the photocell circuit is increased by rotating cell 22 about its axis so that the projected area of that cell exposed to scene light is a function of the cosine of the angle of rotation of the cell, although the entire cell surface is exposed to scene light. The sensitivity of the overall photocell circuit is therefore a function of the sine of the angle of rotation of cell 22.

The present invention also contemplates the use of a single rotatable photocell in an exposure meter. With this construction the photocell circuit has maximum sensitivity when the cell is perpendicular to the path of scene light. The sensitivity then bears a cosine relation to the angle of rotation of the cell away from perpendicularity to the light path.

A further advantage of the invention is realized by rotating the photocell about a horizontal axis, whether one or two cells are used. If the cell is rotatable away from perpendicularity to the light path in such direction that its face points downward, then a significant proportion of skylight may be excluded from the cell, which effect is desirable in order to properly expose a subject backlighted by the sky.

The invention has been described in detail with particular reference to preferred embodiments thereof, but it will be understood that variations and modifications can be effected within the spirit and scope of the invention as described hereinabove and as defined in the appended claims.

We claim:

1. In an exposure meter having a housing, the combination comprising: an electrical photocell circuit including first and second photocells normally disposed in physically parallel relation to each other for illumination of front surfaces thereof by light from the exterior of said housing and electrically connected in opposed parallel relation to each other; and means for adjusting the sensitivity of said photocell circuit, comprising means for pivotally mounting said first photocell in said housing, and means for moving said first photocell angularly about said pivotal mounting means, whereby the sensitivity of said circuit increases with rotation of said first photocell away from physically parallel relation to said second photocell.

2. The combination defined in claim 1, wherein said meter has a normal operating orientation in which said first photocell is pivotable about a horizontal axis, whereby downward pivoting of the front surface of said first photocell decreases the illumination thereof by skylight.

References Cited in the file of this patent

UNITED STATES PATENTS 2,917,969    Stimm _____ Dec. 22, 1959

FOREIGN PATENTS 1,039,830    France _____ Oct. 9, 1953